United States Patent
Miller et al.

(10) Patent No.: US 9,162,703 B2
(45) Date of Patent: Oct. 20, 2015

(54) STEERING CONTROLLER FOR PRECISION FARMING

(71) Applicant: Hemisphere GPS LLC, Scottsdale, AZ (US)

(72) Inventors: Steve Miller, Scottsdale, AZ (US); Brian Ganz, Carlsbad, CA (US); James Hutchings, Carlsbad, CA (US); Charles D. Syverson, North Mankato, MN (US)

(73) Assignee: AgJunction, LLC, Hiawatha, KS (US)

( * ) Notice: Subject to any disclaimer, the term of this patent is extended or adjusted under 35 U.S.C. 154(b) by 0 days.

(21) Appl. No.: 13/754,656

(22) Filed: Jan. 30, 2013

(65) Prior Publication Data

US 2014/0214275 A1    Jul. 31, 2014

(51) Int. Cl.
*B62D 5/04* (2006.01)
*B62D 1/20* (2006.01)
*B62D 5/00* (2006.01)
*B62D 1/16* (2006.01)

(52) U.S. Cl.
CPC ... *B62D 5/04* (2013.01); *B62D 1/16* (2013.01); *B62D 1/20* (2013.01); *B62D 5/00* (2013.01); *B62D 5/001* (2013.01)

(58) Field of Classification Search
CPC ............ B62D 5/00; B62D 5/001; B62D 5/04; B62D 1/16; B62D 1/20
USPC ............... 701/41–42; 180/400, 443–444, 446
See application file for complete search history.

(56) References Cited

U.S. PATENT DOCUMENTS

| | | | | |
|---|---|---|---|---|
| 3,796,112 A | * | 3/1974 | Hoffman | 74/493 |
| 3,817,118 A | * | 6/1974 | Kitzner et al. | 74/492 |
| 4,173,265 A | * | 11/1979 | Kremer | 180/443 |
| 4,566,712 A | * | 1/1986 | Motrenec | 280/272 |
| 4,602,520 A | * | 7/1986 | Nishikawa et al. | 74/493 |
| 4,998,999 A | * | 3/1991 | Yuzuriha et al. | 280/777 |
| 5,449,199 A | * | 9/1995 | Heinrichs et al. | 280/775 |
| 6,029,765 A | * | 2/2000 | Chou et al. | 180/292 |
| 6,427,542 B1 | * | 8/2002 | Nicot | 73/862.326 |
| 6,782,969 B2 | * | 8/2004 | Kodama et al. | 180/446 |
| 6,913,109 B2 | * | 7/2005 | Kodama et al. | 180/446 |
| 8,020,893 B2 | * | 9/2011 | Lucas et al. | 280/775 |
| 8,118,328 B2 | * | 2/2012 | Uchihara et al. | 280/779 |
| 2001/0052427 A1 | * | 12/2001 | Eppink et al. | 175/40 |
| 2004/0133323 A1 | * | 7/2004 | Kodama et al. | 701/41 |

(Continued)

FOREIGN PATENT DOCUMENTS

JP    2007326453 A   * 12/2007

*Primary Examiner* — John Q Nguyen
*Assistant Examiner* — Michael Ng
(74) *Attorney, Agent, or Firm* — Law Office of Mark Brown, LLC; Mark E. Brown; Christopher M. DeBacker (57) ABSTRACT

A steering controller can control steering of a vehicle and is suitable for precision farm controlling. The steering controller can rotate the steering shaft of the vehicle direct the vehicle on a desired path, for example, using a satellite positioning system. Components of the steering controller are environmental protected by a housing that has an opening extending between its front and rear surfaces. The opening is lined by a shaft. A hub located near the front of the opening can be coupled to the steering shaft of the vehicle. A motor has a stator fixed to the housing and a rotor fixed to the hub. When the housing is attached to a fixed location on the vehicle, the motor can rotate the steering shaft by rotating the hub with respect to the housing. A control module drives the motor based on commands from a guidance module.

1 Claim, 10 Drawing Sheets

(56) References Cited

U.S. PATENT DOCUMENTS

2005/0279562 A1* 12/2005 Hara et al. .................... 180/402
2007/0043490 A1*  2/2007 Yokota et al. .................. 701/41
2008/0011538 A1*  1/2008 Saito et al. .................... 180/444
2008/0264714 A1* 10/2008 Morikawa ..................... 180/446
2010/0236845 A1*  9/2010 Ishii et al. .................... 180/65.6
2010/0282535 A1* 11/2010 Saitou et al. .................. 180/444
2011/0190986 A1*  8/2011 Bitou et al. ..................... 701/41
2012/0130593 A1*  5/2012 Davis et al. .................... 701/41
2012/0144947 A1*  6/2012 Herbert et al. ............. 74/473.31

* cited by examiner

STEERING CONTROLLER FOR PRECISION FARMING

BACKGROUND

The present invention generally relates to the field of automated vehicle steering control and to a steering controller for precision farming.

Agricultural operations can be improved if the locations of the implements performing the operations are accurately controlled. Satellite positioning systems, particularly those with local augmentation, can provide accurate location information. Systems for automatically steering agricultural tractors have been developed that use location information from satellite positioning systems to control implement location. Existing systems may have limited operating speeds. The operating speed may be reduced by dynamic limitations of the steering controllers used. Similar limitations exist in controlling the location of other vehicles.

SUMMARY

In one aspect, the invention provides a steering controller for controlling steering of a vehicle, including: a housing having a cylindrical opening extending from a front surface of the housing to a rear surface of the housing, the cylindrical opening lined by a shaft; a hub disposed concentrically proximate the cylindrical opening proximate the front surface of the housing, the hub arranged for coupling to a steering shaft of the vehicle; a motor comprising a stator fixedly coupled to the housing and a rotor fixedly coupled to the hub; an encoder disk fixedly coupled to the hub; an angle encoder arranged to sense angular positions of the encoder disk; and a control module arranged to drive the motor based on commands from a guidance module and angular information form the angle encoder.

In another aspect, the invention provides a steering controller for controlling steering of a vehicle, including: a housing having a cylindrical opening extending from a front surface of the housing to a rear surface of the housing, the cylindrical opening lined by a shaft; a donut having an annular shape, the donut disposed around and rotatably coupled to the shaft; a hub disposed concentrically with the cylindrical opening proximate the front surface of the housing and fixedly coupled to the donut, the hub arranged for coupling to a steering shaft of the vehicle; a motor comprising a stator fixedly coupled to the housing and a rotor fixedly coupled to the donut; and a control module arranged to drive the motor based on commands from a guidance module, the control module including a monitor module configured to limit torque applied by the motor between the hub and the housing.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
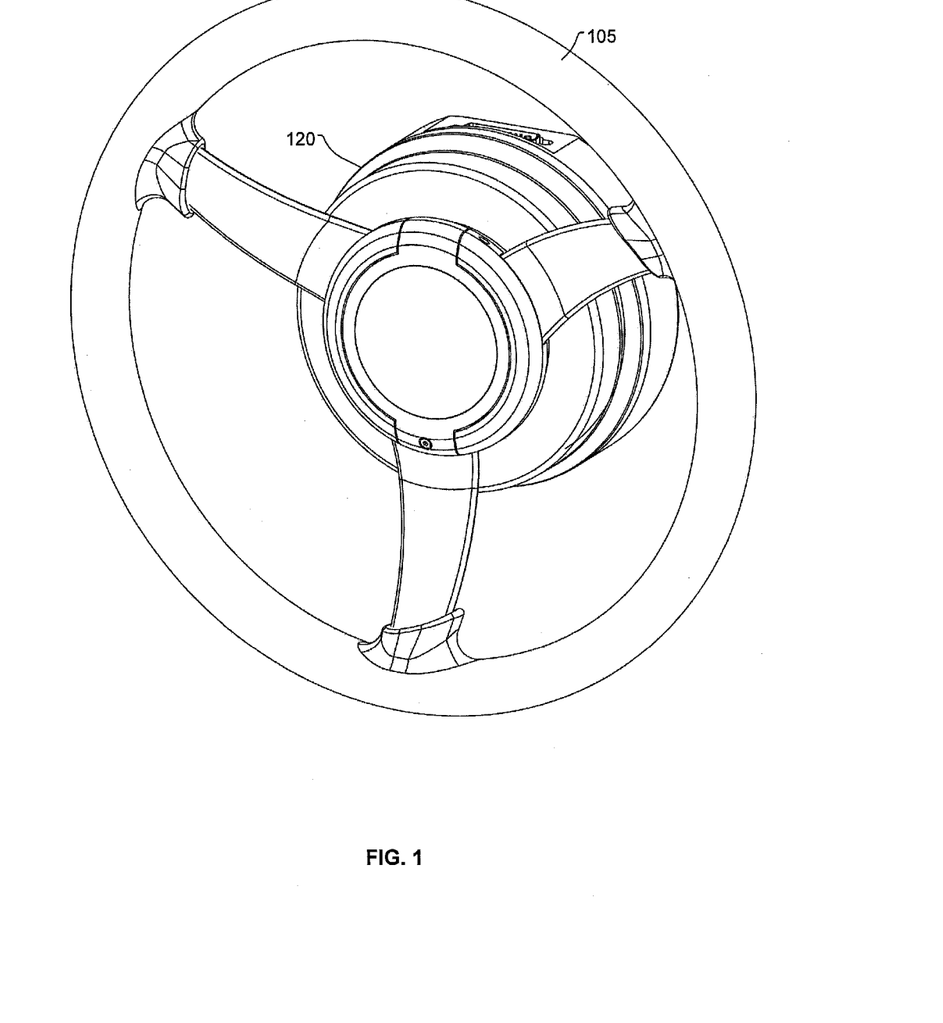
FIG. 1 is a front perspective view of a steering controller in accordance with aspects of the invention.
Figure 2:
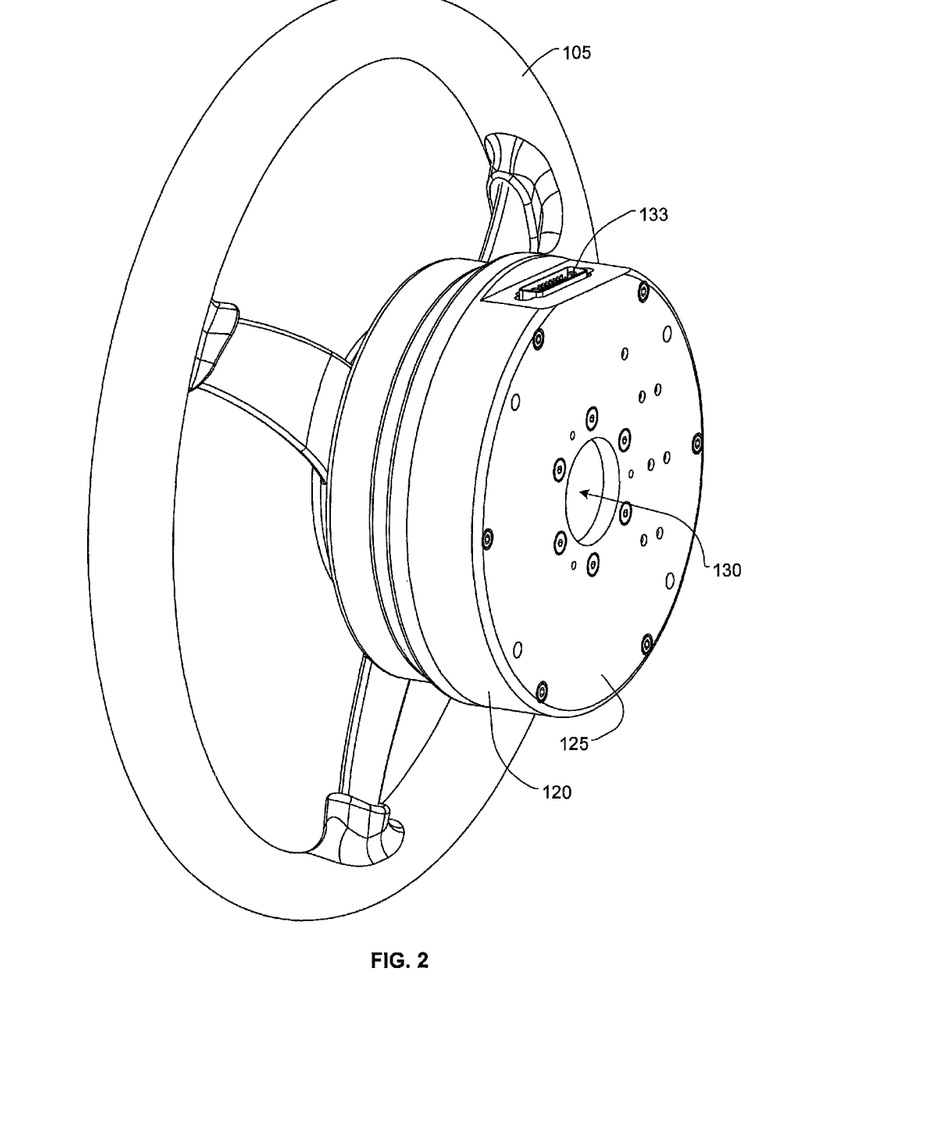
FIG. 2 is a rear perspective view of the steering controller of FIG. 1.

FIGS. 1 and 2 are perspective views of a steering controller. FIG. 1 can be considered a front view and FIG. 2 a rear view. However, the terms front and rear (and similar directional terms) are used for descriptive purposes and do not denote any particular physical locations or orientations of the steering controller. Some descriptions of the steering controller reference use in agricultural equipment; however, the steering controller is useful in other applications, for example, marine vessels. The steering controller includes a steering wheel 105 and a drive assembly 120.

The steering controller may be mounted in a location similar to a manual steering wheel to control steering of a vehicle. The drive assembly 120 can be mounted to a fixed location on the vehicle. The mounting may be performed by attaching a rear surface 125 of steering controller to the fixed location. The fixed location is fixed in the sense that it does not move, for example, rotate, with steering of the vehicle. The drive assembly 120 includes a drive coupling 130 for attachment to a steering mechanism of the vehicle. The drive coupling 130, for example, may have a splined coupling for mating to a splined end of a steering shaft.

A motor in the drive assembly 120 has its stator fixedly coupled to the rear surface 125 and its rotor fixedly coupled to the drive coupling 130. The motor can thus rotate the drive coupling 130 relative the rear surface 125. With the rear surface 125 fixedly mounted to a fixed location in a vehicle and the drive coupling 130 attached to the steering mechanism of the vehicle, the steering controller can control the vehicle steering through rotation of the motor.

The drive assembly 120 has a guidance interface 133 for coupling to a guidance module. Via the guidance interface 133, the steering controller may be instructed how to steer the vehicle. For example, the steering controller may be instructed to rotate the steering to a particular location or rotate the steering at a particular angular velocity. The drive assembly 120 may also supply status information via the guidance interface 133.

The steering wheel 105 is coupled to the drive coupling 130. Accordingly, the steering wheel 105 rotates with the steering of the vehicle. The steering wheel 105 can be used by an operator to manually steer the vehicle. Additionally, the steering wheel 105 can be used to override control by the drive assembly 120.

Figure 3:
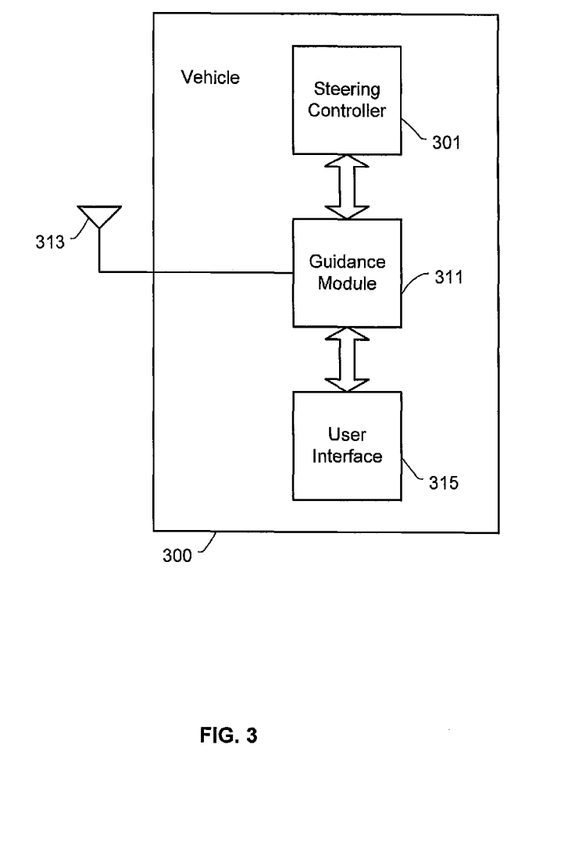
FIG. 3 is a block diagram of aspects of system using a steering controller in accordance with aspects of the invention.

FIG. 3 is a block diagram of aspects of a vehicle using a steering controller. The steering controller 301 may be provided by the steering controller shown in FIGS. 1 and 2. The vehicle 300 may be, for example, an agricultural tractor that uses the steering controller 301 for automatic steering as directed by a guidance module 311. The steering controller 301 can be added to the vehicle 300 and steer the vehicle via the vehicle's existing steering system. For example, the steering controller 301 may rotate a steering shaft. In the case of an agricultural vehicle, the vehicle's existing steering system is typically a hydraulic based system. The steering controller 301 and guidance module 311 operate according to the characteristics of the vehicle's steering system.

The guidance module 311 acquires position indication signals using an antenna 313. The position indication signals can use global navigation satellite system (GNSS) receivers. The antenna 313 is typically installed on the roof of the cabin of the vehicle 300. The guidance module 311 can use the position indication signals to direct the vehicle 300 to travel along a desired path. In an embodiment, the system includes multiple antennas. The guidance module 311 can, for example, acquire position indication signals signaling orientation of the vehicle. Additionally, the system can use enhanced positioning information, such as wide area augmentation system (WAAS) and real time kinematic (RTK) positioning. The guidance module 311 can also use information from other sensors, such as gyroscopes. Embodiments of the system generally operate without a sensor for the steering angle of the vehicle but can infer the steering angle from, for example, the position indication signals and status information from the steering controller 301.

Operators of the vehicle interact with the guidance module 311 using a user interface 315. The user interface 315 can include a touch screen display. Operators can, for example, select courses for the guidance module 311 to direct the vehicle 300. The user interface 315 also provides information about the guidance system to the operators. The guidance module 311 can also control or receive information from other system and devices. For example, the guidance module 311 may control operation of an agricultural implement drawn by the vehicle 300. The guidance module 311 may also interact with other devices via the vehicle's controller area network (CAN) bus. Wireless communication can also be used between the vehicle modules.

FIG. 3 illustrates a particular combination of modules and allocation of functions among the modules. Many other combinations and allocations are also available. For example, in an embodiment, all or parts of the guidance module 311 may be integrated with the steering controller 301.

Figure 4:
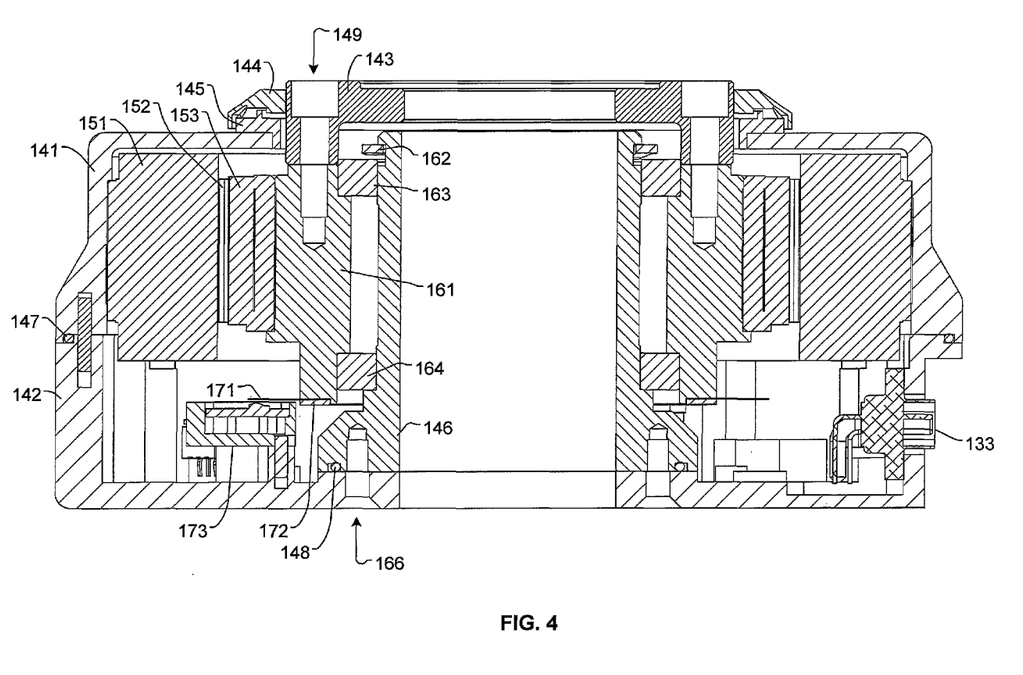
FIG. 4 is a cross-section of a steering controller in accordance with aspects of the invention.
Figure 5A:
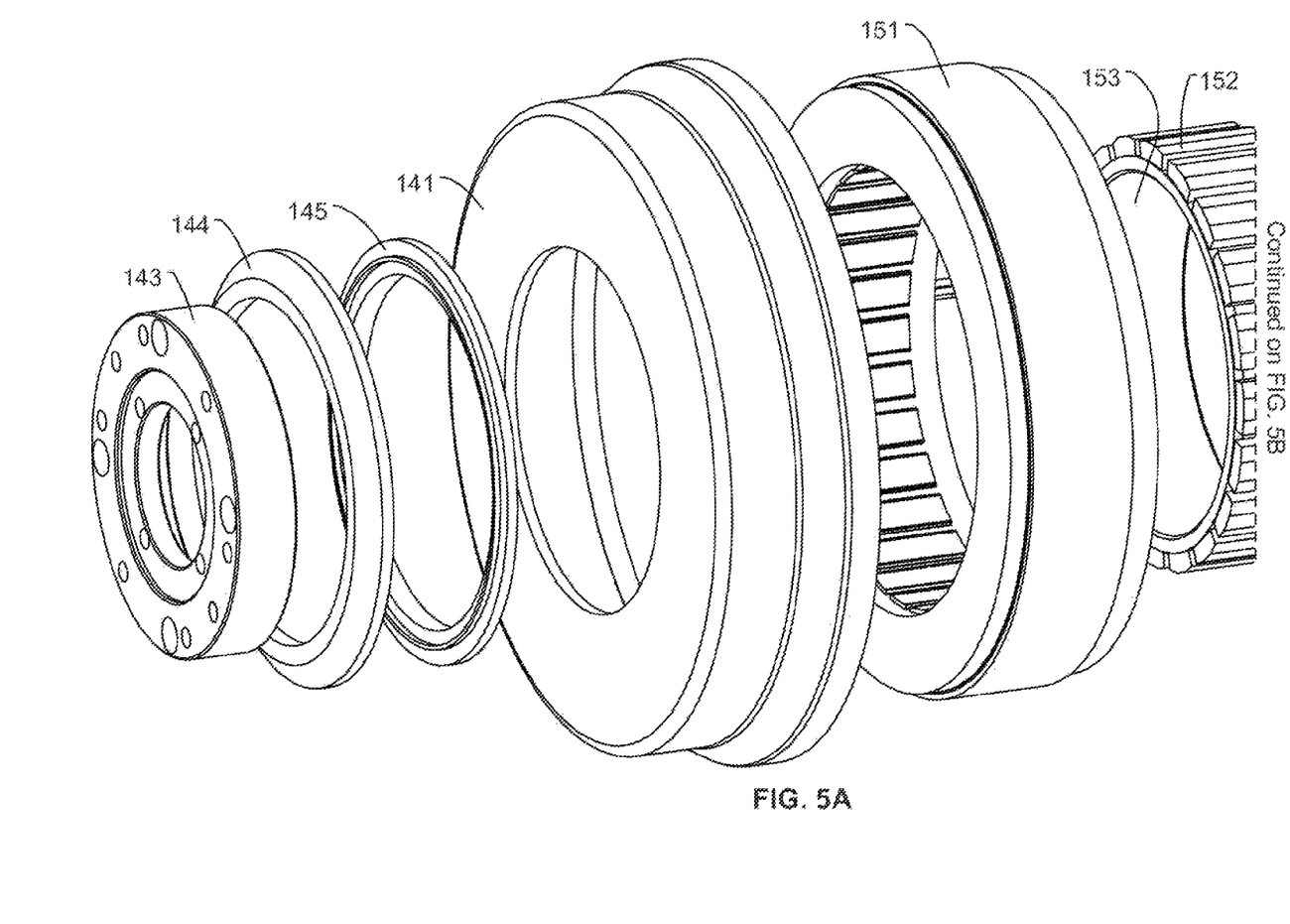
FIGS. 5A and 5B show an exploded view of the steering controller of FIG. 4.
Figure 5B:
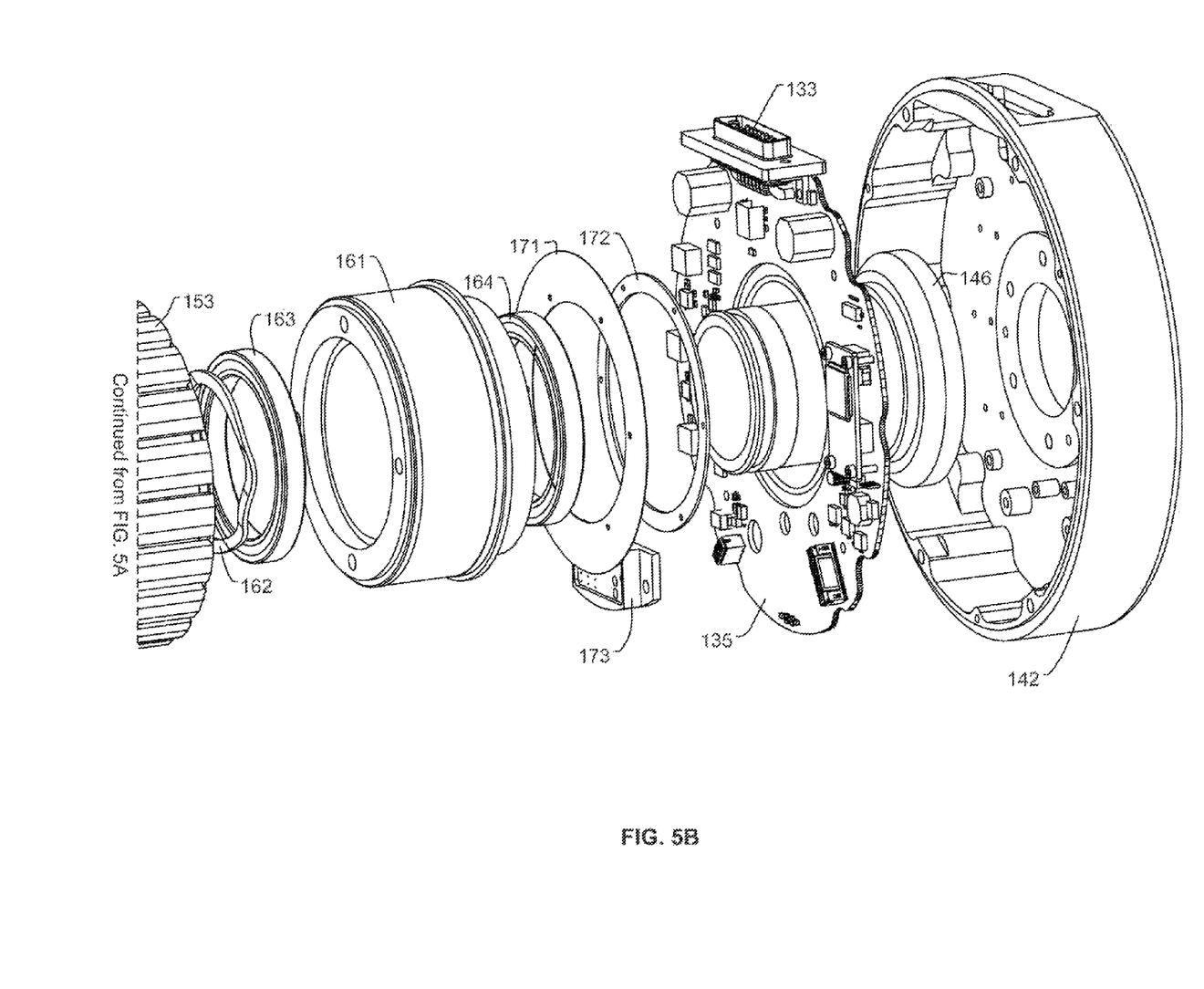

FIG. 4 is a cross-section of a steering controller and FIG. 5 is an exploded view of the steering controller. The steering controller may be used as the drive assembly 120 of FIGS. 1 and 2 and as the steering controller 301 of FIG. 3. As described for the FIGS. 1 and 2, the steering controller has an enclosure or housing for mounting in a vehicle and a motor to turn the vehicle's steering. Many elements of the steering controller are symmetrical (or symmetrical except for limited variations) about a common axis. For clarity, symmetrical sides of elements are only labeled on one side of the cross-sectional view of FIG. 4.

The steering controller is largely enclosed by a front housing 141, a rear housing 142, and a shaft 146. The front housing 141 and the rear housing 142, in the shown embodiment, have shallow pan shapes with central openings. The front housing 141 and the rear housing 142 combine to form a generally cylindrical enclosure with a cylindrical opening extending from front to rear. The cylindrical opening is bounded by an inner surface of the shaft 146 which is annular shaped. The front housing 141, the rear housing 142, and the shaft 146 are fixed together as a non-rotating part of the steering controller.

The front housing 141, the rear housing 142, and the shaft 146 may be formed of aluminum. Although surfaces of the enclosure are smooth in the illustrated embodiment, other shapes may also be used. For example, the front housing 141 may have fins or flutes for improved heat dissipation. The rear housing 142 may, for example, have various tabs, slots, threaded holes, and the like for mounting to a vehicle. Additionally, the shapes may be varied for aesthetic purposes.

The front housing 141 and the rear housing 142 join near a mid-plane of the steering controller. The front housing 141 and the rear housing 142 may be secured together by mechanical fasteners. The joint is environmentally sealed by an outer O-ring 147. The outer O-ring 147 is located in a grove formed by rabbeted portions of the adjoining edges of the front housing 141 and the rear housing 142.

The rear housing 142 and the shaft 146 join at the periphery of the opening in the rear housing 142. The rear housing 142 and the shaft 146 may be secured together by mechanical fasteners, for example, bolted through shaft fastener openings 166. The joint between the rear housing 142 and the shaft 146 is environmentally sealed by an inner O-ring 148. The inner O-ring 148 is located in a grove formed in a rear surface of the shaft 146.

The steering controller includes a hub 143 for connection to a vehicle's steering shaft. The hub 143 is annular shaped and is located at the front of the cylindrical opening of the enclosure. The hub 143 may be connected to the vehicle's steering shaft via an adapter. Various adapters may be used depending on dimensions and shapes of particular steering shafts.

The hub 143 is coupled to the steering controller's motor via a donut 161. The donut 161 is annular shaped and is located around the shaft 146. In the illustrated embodiment, the donut 161 is fastened to the hub 143 by bolts through donut fastener openings 149.

The donut 161 is rotatably coupled to the shaft 146 by a front bearing 163 and a rear bearing 164. The front bearing 163 sets in a rabbeted inside edge at the front of the donut 161. The rear bearing 164 sets in a rabbeted inside edge at the rear of the donut 161. In various embodiments, the front bearing 163 and the rear bearing 164 may be the same or similar. Ball bearings may be used.

A spring ring 162 is located in a grove in the outer surface of the shaft 146 near the front. The spring ring 162 secures the position of donut 161 (and thereby the hub 143) with respect to the shaft 146 (and thus the housing). The spring ring 162 biases the front bearing 163 rearward. Rearward movement is restricted by the front bearing 163 contacting the rabbeted inside edge at the front of the donut 161, the rabbeted inside edge at the rear of the donut 161 contacting the rear bearing 164, and the rear bearing 164 contacting an inward protruding lip near the rear of the shaft 146.

The steering controller is resistant to water intrusion. Where the front housing 141 and the rear housing 142 join, the interface is sealed by the outer O-ring 147. Similarly, where the rear housing 142 and the shaft 146 join, the interface is sealed by the inner O-ring 148. The hub 143 rotates relative to the front housing 141 and the shaft 146. The interface between the hub 143 and the front housing 141 is protected by a seal 144 and a seal seat 145. The seal 144 is fixed to the hub 143. The seal seat 145 is fixed to the front housing 141. Interspersed ridges on the hub 143 and the front housing 141 create a torturous path that deters intrusion by dirt and water. A membrane may be placed between the seal 144 and the seal seat 145. The interface between the hub 143 and the shaft 146 is protected from above by the center of the steering wheel 105. The interface between the hub 143 and the shaft 146, when installed in a vehicle, is protected from below by the mounting to the vehicle. In particular, the opening in the center of the shaft 146 will be substantially filled by the steering shaft of the vehicle. Thus, water intrusion from below is also blocked.

The motor of the steering controller has a stator 151 and a rotor 153. The stator 151 is fixed to the enclosure. The outer circumference of the stator 151 may be press fit to the inside of the front housing 141. The interface between the stator 151 and the front housing 141 may include thermally conductive material to improve cooling of the motor. The stator 151 may be held in the front-rear direction by a protruding lip of the stator 151 setting against a corresponding lip on the inner surface of the front housing 141.

The rotor 153 is fixed to the donut 161. Since the donut 161 is fixed to the hub 143 and the hub 143, when installed in a vehicle, is fixed to the steering shaft of the vehicle, the motor can control steering of the vehicle. The motor can provide high torque, for example, 55 in-lb, for rapid steering adjustments. The inner circumference of the rotor 153 may be press fit to the outside of the donut 161. The rotor 153 may be held in the front-rear direction by a rear edge of the rotor 153 setting against a corresponding lip on the outer surface of the donut 161.

The motor may be considered a fractional-slot concentrated winding motor. Fractional-slot refers to the ratio of slots (and coils) to magnetic poles not being an integer. Concentrated refers to coils that span only one stator tooth. This provides a stator that is simple to wind with short end extensions thereby providing low copper weight and compact size.

Figure 6:
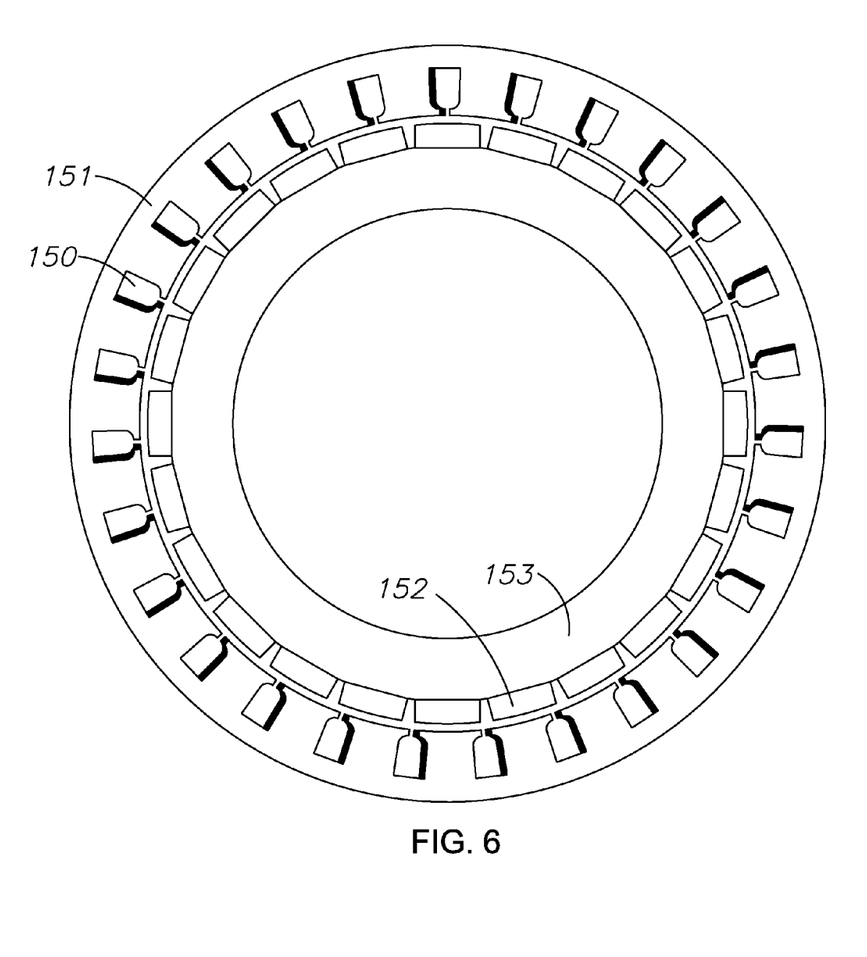
FIG. 6 is a plan view of a stator and a rotor in accordance with aspects of the invention.

The rotor 153, in the embodiment shown in FIG. 6, has twenty-four magnets 152 distributed about the periphery of the rotor. The fields of the magnets 152 extend radially and the polarities alternate between adjacent magnets. Each of the magnets 152 has a bread loaf shape. A flat surface of each of the magnets 152 attaches to the corresponding flat area of the rotor 153. The magnets 152 may be attached to the rotor 153 with adhesive. The outer surfaces of the magnets 152 have a radius sized to form a circle when attached to the rotor 153. The magnetic material may be, for example, samarium cobalt. The samarium cobalt may be grade 26HS.

The stator 151 has circumferentially distributed stator slots 150 for coil windings 156. In the embodiment shown in FIG. 7, there are twenty-seven stator slots 150. Coil windings are placed in adjacent pairs of the stator slots 150. The coil windings may be, for example, 18 gauge copper magnet wire. A temperature sensor or sensors may be included in one or more of the coil windings. In an embodiment, a resistance temperature detector (RTD) is placed in one of the coil windings and coupled to a controller module 135.

Figure 7:
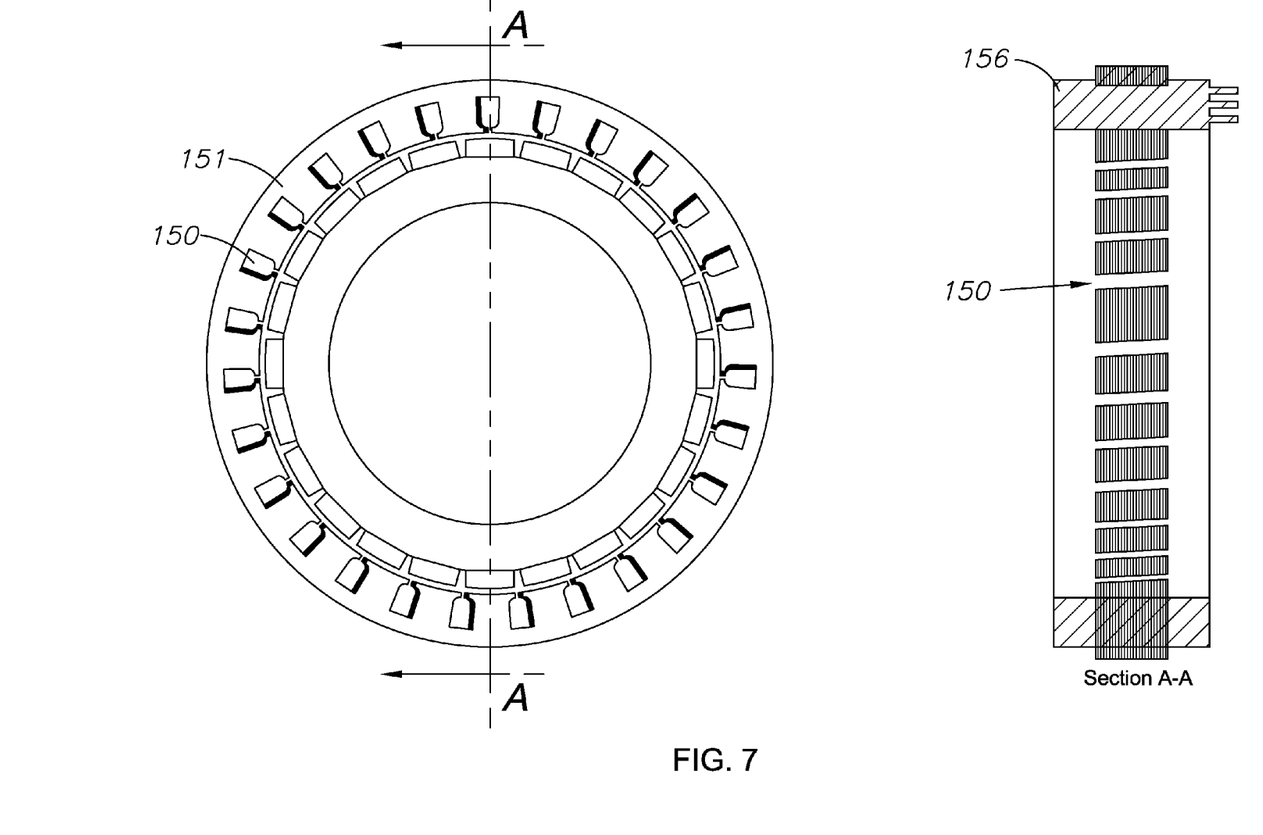
FIG. 7 is a plan view and cross-section of a stator in accordance with aspects of the invention.

The stator 151 is formed of laminated layers. The laminated layers may be skewed (rotated) from front to rear of the stator 151. In an embodiment, the stator slots 150 are rotated by one half of one slot pitch from front to rear. Skewing the stator slots 150 can reduce cogging.

The stator 151 of FIG. 7 is for a three-phase DC brushless motor, and the coil windings are grouped in three phases. In an embodiment, the coil windings are arranged as shown in Table 1.

TABLE 1

Coil Winding Locations

| Coil | Go | Return | Throw | Turns |
|---|---|---|---|---|
| Phase 1 | | | | |
| 1 | 1 | 2 | 1 | 22 |
| 2 | 10 | 9 | -1 | 22 |
| 3 | 17 | 18 | 1 | 22 |
| 4 | 10 | 11 | 1 | 22 |
| 5 | 19 | 18 | -1 | 22 |
| 6 | 26 | 27 | 1 | 22 |
| 7 | 19 | 20 | 1 | 22 |
| 8 | 1 | 27 | -1 | 22 |
| 9 | 8 | 9 | 1 | 22 |
| Phase 2 | | | | |
| 1 | 4 | 5 | 1 | 22 |
| 2 | 13 | 12 | -1 | 22 |
| 3 | 20 | 21 | 1 | 22 |
| 4 | 13 | 14 | 1 | 22 |
| 5 | 22 | 21 | -1 | 22 |
| 6 | 2 | 3 | 1 | 22 |
| 7 | 22 | 23 | 1 | 22 |
| 8 | 4 | 3 | -1 | 22 |
| 9 | 11 | 12 | 1 | 22 |
| Phase 3 | | | | |
| 1 | 7 | 8 | 1 | 22 |
| 2 | 16 | 15 | -1 | 22 |
| 3 | 23 | 24 | 1 | 22 |
| 4 | 16 | 17 | 1 | 22 |
| 5 | 25 | 24 | -1 | 22 |
| 6 | 5 | 6 | 1 | 22 |
| 7 | 25 | 26 | 1 | 22 |
| 8 | 7 | 6 | -1 | 22 |
| 9 | 14 | 15 | 1 | 22 |

The motor is arranged to provide many advantageous features. The motor can provide very low magnetic cogging. The waveform of the generated back electromagnetic field is nearly sinusoidal. The generated waveforms from the winding include virtually no harmonics. The windings have little end extension so the physical space required is modest. The motor provides a high power density, high operating efficiency, low operating losses, and high torque.

Returning to FIGS. 4 and 5, the steering controller includes an encoder disk 171 and an angle encoder 173 for sensing position of the wheel. The encoder disk 171, in the embodiment illustrated in FIGS. 4 and 5, is fastened to the donut 161. Thus, the encoder disk 171 rotates with the hub 143 and rotor 153 and can be used to sense the angular position of the rotating components of the steering controller. The encoder disk 171 may be fastened to the donut 161 using an encoder clamp 172. The encoder clamp 172 is a flat disk and may be fastened to the donut 161 by machine screws.

The angle encoder 173 and encoder disk 171 may use an incremental quadrature code. One or more index pulses may also be provided for absolute positioning. In an embodiment, the angle encoder 173 provides 4096 codes per rotation. The encoder disk 171 may be formed with stainless steel.

The steering controller also includes a controller module 135. The controller module 135 provides control of the motor of the steering controller and interfaces to other vehicle components via a connector 133. In addition to conveying communication signals to and from the steering controller, the connector 133 can be used to supply power to the steering controller. The steering controller is operable in harsh environments. For example, the steering controller can be operated over extreme temperatures such as from −20° to 70° C. The steering controller is also resistant to intrusion by dirt and water. To provide resistance to intrusion by dirt and water, the connector 133 may be a connector rated IP67.

The controller module 135 may be in the form of a printed circuit board. In addition to components mounted on the printed circuit board, some components, for example, the motor's temperature sensor and the angle encoder 173, may be coupled to the controller module via connectors.

In an embodiment, the front housing 141 and the rear housing 142 have outer diameters of about 170 mm and a combined depth of about 70 mm. The hub 143 has an outer diameter of about 85 mm and an inner diameter of about 40 mm. The shaft 146 has an inner diameter of about 40 mm. The donut 161 has an outer diameter of about 90 mm and an inner diameter of about 60 mm. The stator 151 has an outer diameter of about 150 mm, an inner diameter of about 123 mm, and a depth of about 15 mm for the laminations and about 30 mm with windings. The rotor 153 with magnets 152 has an outer diameter of about 122 mm, an inner diameter of about 90 mm, and a depth of about 20 mm. The encoder disk 171 has an outer diameter of about 92 mm and an inner diameter of about 69 mm.

Figure 8:
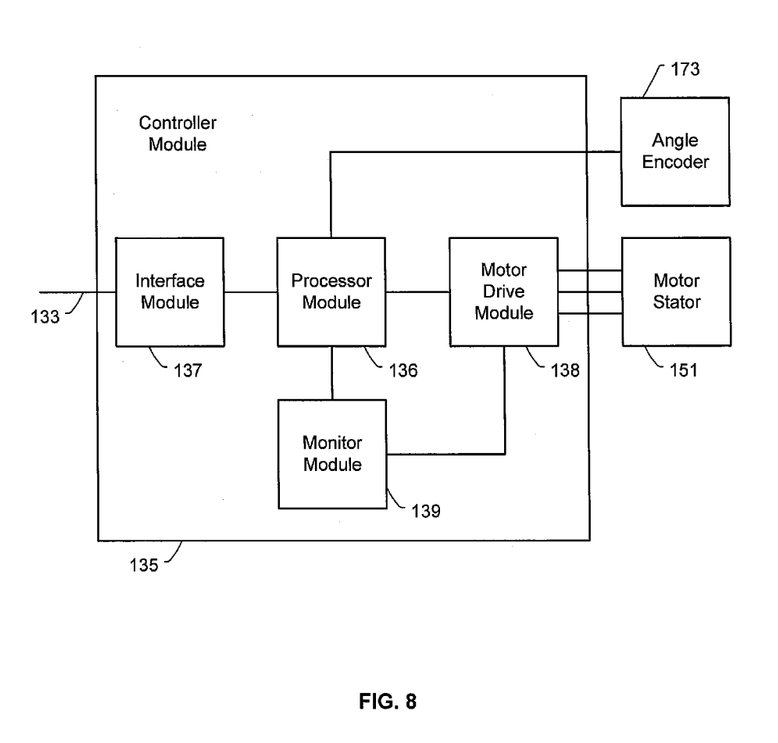
FIG. 8 is a functional block diagram of aspects of a controller module of a steering controller in accordance with aspects of the invention.

FIG. 8 is a functional block diagram of aspects of a controller module of a steering controller. The controller module of FIG. 8 may provide the controller module 135 of FIGS. 4 and 5. FIG. 8 shows the controller module 135 coupled to a motor stator 151 and an angle encoder 173. The controller module 135 communicates with other components via a guidance interface 133.

In an embodiment, the steering controller accepts a DC supply voltage. The nominal voltage level of the supply may be 12 V. The steering controller may also accept a range of voltages, for example, for 9 V to 36 V. The supply voltage may be provided via the guidance interface 133.

The controller module 135 includes a motor drive module 138 that supplies three electrical phases to the motor stator 151. The motor drive module 138 amplifies signals received from a processor module 136. The motor drive module 138 may use, for example, power transistors to drive the motor stator 151. The processor module 136 may provide low-level pulse-width modulation (PWM) sinusoidal signals to the motor drive module 138 for amplification. The processor module 136 can thus control the speed and drive strength of the motor.

The motor drive module 138 can include current sensing circuitry to measure current supplied the motor stator 151. The processor module 136 may use the current measurement to control and limit the current. The motor drive module 138 can include current limiting circuitry to impose limits on the current supplied the motor stator 151. The current may be limited to different magnitudes depending on duration, for example, the current may be limited to 10 A continuous and 20 A for two seconds.

The processor module 136 receives angular position information from the angle encoder 173. The processor module 136 can use the angular position information to determine how to move the steering to a desired position. The processor module 136 provides a high-speed control loop. In an embodiment, the closed-loop response is about 50 Hz. Furthermore, the steering controller may rotate at speeds of about 100 revolutions per minute.

The angular position information may also be used to time the commutation of the motor phases. The processor module 136 can use an initial rotation of the rotor to learn the commutation sequence. For example, the operator can be instructed to turn the steering wheel (and thereby the rotor) before operation of the steering controller begins.

The processor module 136 is coupled to the guidance interface 133 via an interface module 137. In various embodiments, the interface module 137 provides communication on the guidance interface 133 using one or more protocols such as controller area network (CAN) bus, Ethernet, NMEA 0183, and RS-232. The interface module 137 may provide opto-isolation for some interface signals. The controller module 135 may receive auxiliary inputs and produce auxiliary outputs. The auxiliary signals may be analog or digital. The auxiliary signals may be coupled to the controller module 135 via the guidance interface 133 or a separate interface.

The controller module 135 includes a monitor module 139. The monitor module 139 can limit the torque applied by the motor of the steering controller. Limiting the torque allows a vehicle operator to physically override the steering controller. An externally applied torque can be sensed and when greater than a threshold, the steering controller disabled. When the externally applied torque is from a vehicle operator, sensing the torque allows the steering controller to be disabled without the operator activating a separate switch mechanism.

The monitor module 139, in an embodiment, provides an integrated motor power switch. The monitor module 139 may supply power to the motor drive module 138 for driving the motor. The monitor module 139 can include relays to enable or disable the power supply to the motor drive module 138. An embodiment of the monitor module 139 may include two series relays in the power path to the motor drive module 138. One of the relays can be controlled by the processor module 136. Another of the relays can be opened based on the current supplied. For example, the relay may open with current is greater than threshold. This can provide hardware protection against faults.

The processor module 136 can receive a temperature signal from the motor stator 151. The temperature can be compared to a limit and the steering controller disabled if the limit is exceeded. The temperature may also be used in setting the stator phase currents. For example, the currents may be reduced when the temperature nears a high threshold value.

The controller module 135 can receive various commands via the connector 133. Execution of the various commands requires little time, for example, less than 1 ms. One command that may be received by the steering controller is a velocity control (VC) command. The VC command starts wheel motion in the velocity control mode. The VC command includes a parameter or parameters to signal the direction of rotation and the speed. The VC command may specify a velocity of zero to command the wheel to stop turning and hold the current position.

Another command that may be received by the steering controller is a position control (PC) command. The PC command moves the wheel to a new position specified in the command in a position control mode. The velocity at which the wheel moves to the new position may be limited by a maximum velocity. The maximum velocity may be, for example, specified by the PC command as a parameter or separately set. The position may be specified in counts of the angle encoder. The position can be relative to a zero setting that indicates a generally neutral steering position.

Another command that may be received by the steering controller is an engage wheel (EW) command. The EW command can be used to enable or disable control of vehicle steering by the steering controller. When the EW command disables control by the steering controller, the steering controller may stop motion of the wheel before disabling control.

Another command that may be received by the steering controller is a current limit (CL) command. The CL command can set a local current limit. If current in the motor exceeds the local current limit, the steering controller can be disabled.

Another command that may be received by the steering controller is a wheel velocity (WV) command. The WV command sets a local maximum velocity. The local maximum velocity may limit wheel velocity in both velocity and position control commands.

Another command that may be received by the steering controller is a zero position (ZP) command. The ZP command sets a current position of the wheel as a zero setting. The zero setting can be used in specifying position of the wheel, for example, by the PC command.

The steering controller may also receive commands that query for status information from the steering controller. One query command that may be received by the steering controller is a query motor current (QC) command. The steering controller responds to the QC command with the current motor current. The current motor current may be a value in amps that is determined from measured stator phase currents.

Another query command that may be received by the steering controller is a query motor torque (QT) command. The steering controller responds to the QT command with the current motor torque. The current motor torque may be a value measured in Nm that is calculated from the electrical drive supplied to the motor.

Another query command that may be received by the steering controller is a query supply voltage (QV) command. The steering controller responds to the QV command with the current supply voltage.

Another query command that may be received by the steering controller is a query motor power (QW) command. The steering controller responds to the QW command with the current motor power. The current motor power may be a value measured in watts that is calculated from motor drive levels or measured directly.

Another query command that may be received by the steering controller is a query inverter temperature (QK) command. The steering controller may respond to the QK command with the current temperature of the coil windings measured in kelvin.

Another query command that may be received by the steering controller is a query engage/disengage status (QE) command. The steering controller may respond to the QE command with the current status of whether the steering control is engaged or disengaged.

Another query command that may be received by the steering controller is a query current position (QP) command. The steering controller may respond to the QP command with the current position of the wheel as measured using the angle encoder.

Figure 9:
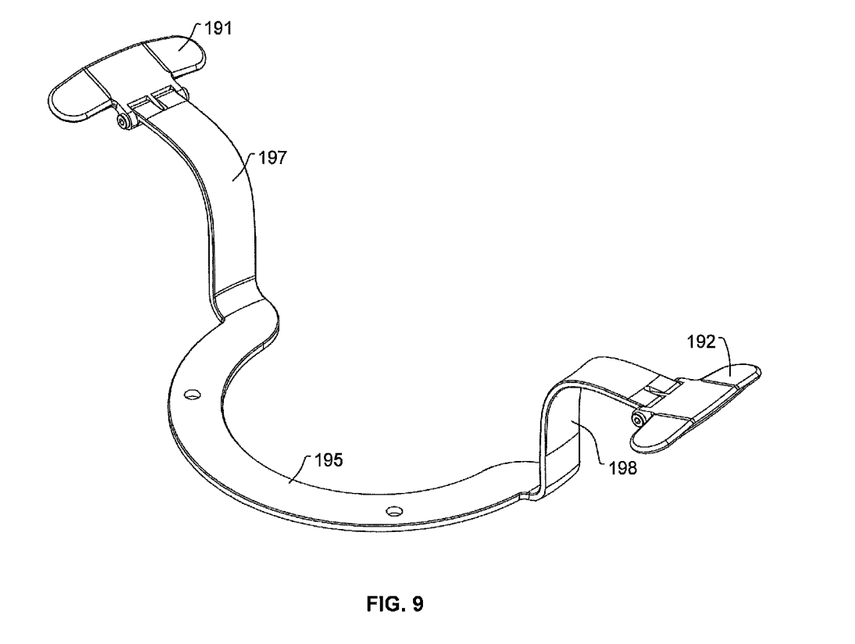
FIG. 9 is a perspective view of a paddle shifter assembly in accordance with aspects of the invention.
Figure 10:
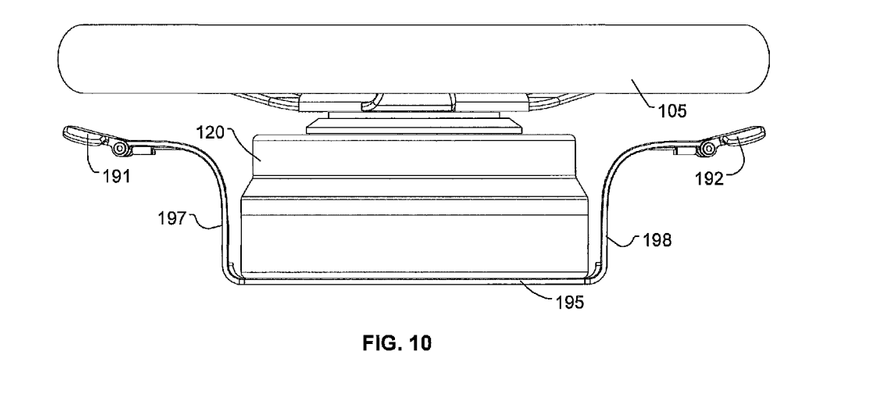
FIG. 10 is a side view of the paddle shifter assembly of FIG. 9 with the steering controller of FIG. 1 in accordance with aspects of the invention.

FIG. 9 is a perspective view of a paddle shifter assembly. FIG. 10 is a side view of the paddle shifter assembly of FIG. 9 with the steering controller of FIG. 1. The paddle shifter assembly includes a left paddle 191 and a right paddle 192. The left paddle 191 is coupled to a left arm 197 by a hinge; the right paddle 192 is coupled to a right arm 198 by a hinge. The left arm 197 and right arm 198 extend from a base plate 195.

As shown in FIG. 10, paddle shifter assembly is sized for mounting to the rear of the drive assembly 120. The left paddle 191 and right paddle 192 are positioned near the steering wheel 105. An operator can actuate the paddles without taking her hands from the steering wheel 105.

The left paddle 191 and right paddle 192 may activate switches when moved towards the steering wheel 105. The status of the switches can be coupled, for example, to the controller in the drive assembly 120. The paddles can signal various operations, such as shifting gears or changing speeds. The paddles can also signal turns, for example, turning at the end of a row in an agricultural application or tacking to port or starboard in a sailboat application.

Those of skill will appreciate that various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

Various illustrative logical blocks, units, steps and modules described in connection with the embodiments disclosed herein can be implemented or performed with a processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter that is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A steering controller for controlling steering of a vehicle, comprising:
   a housing having a cylindrical opening extending from a front surface of the housing to a rear surface of the housing, the cylindrical opening lined by a shaft;
   a donut having an annular shape, the donut disposed around and rotatably coupled to the shaft;
   a hub disposed concentrically with the cylindrical opening proximate the front surface of the housing and fixedly coupled to the donut, the hub arranged for coupling to a steering shaft of the vehicle;
   a motor comprising a stator fixedly coupled to the housing and a rotor fixedly coupled to the donut, the motor comprising a three-phase brushless DC motor, and the controller module being arranged to determine a commutation sequence of the motor by sensing an operator's rotation of the hub;
   a control module arranged to drive the motor based on commands from a guidance module, the control module comprising a monitor module configured to limit torque applied by the motor between the hub and the housing;
   the monitor module is further configured to sense torque of the hub applied by an operator of the vehicle and disengage the steering controller from controlling steering of the vehicle when the magnitude of the torque exceeds a threshold;
   the control module is operable in a velocity control mode that causes the motor to rotate the hub relative to the housing at a desired angular velocity;
   the control module is further operable in a position control mode that causes the motor to rotate the hub relative to the housing to a desired angular position;
   a seal seat having an annular shape and disposed at an opening in the front surface of the housing and seal having an annular shape and disposed about the hub and adjacent the seal seat, the seal seat and seal having interspersed ridges arranged to deter intrusion of foreign matter into the steering controller;
   a front bearing and a rear bearing, wherein the donut is rotatably coupled to the shaft via the front bearing and the rear bearing, wherein the front bearing is disposed at a rabbet at the front edge of the donut and the rear bearing is disposed at a rabbet at the rear edge of the donut;
   a paddle shifter assembly removeably mounted to said drive assembly, said paddle shifter assembly including a first paddle and a second paddle, each coupled to a respective first arm and second arm via a respective first hinge and second hinge, wherein each of said first and second arms extend from a baseplate of said paddle shifter assembly; and
   said paddle shifter assembly configured to activate one or more switches in electronic communication with said steering controller, wherein said one or more switches are paired with one or more actions associated with functions capable of being performed by said vehicle.

* * * * *